(No Model.)
W. W. JACKSON.
FAUCET.
No. 348,914. Patented Sept. 7, 1886.
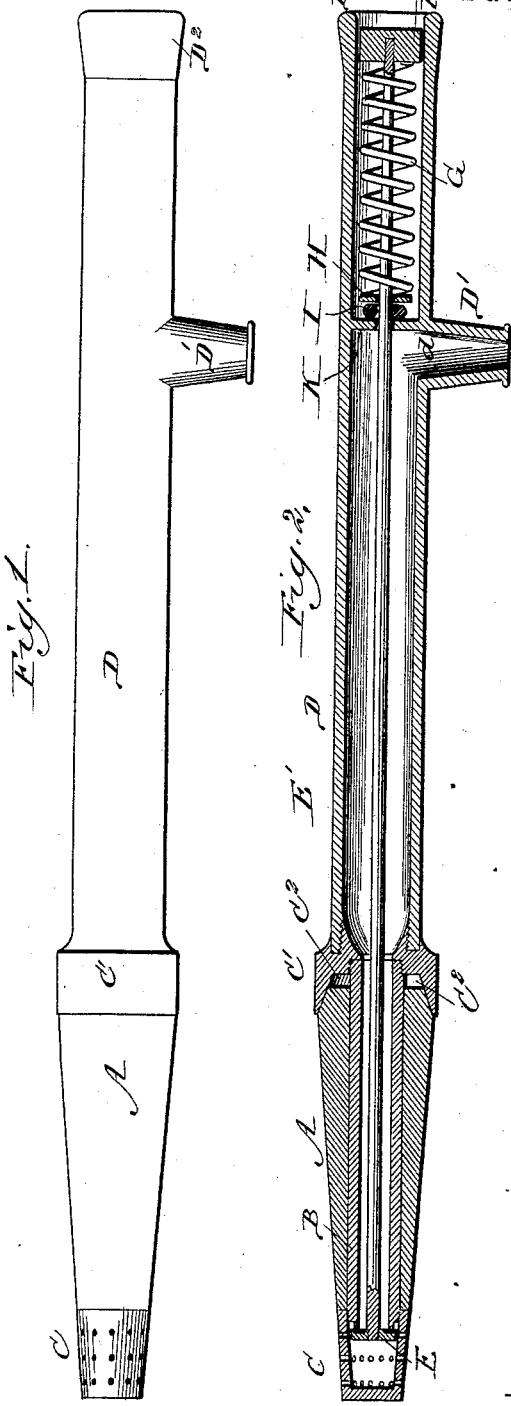
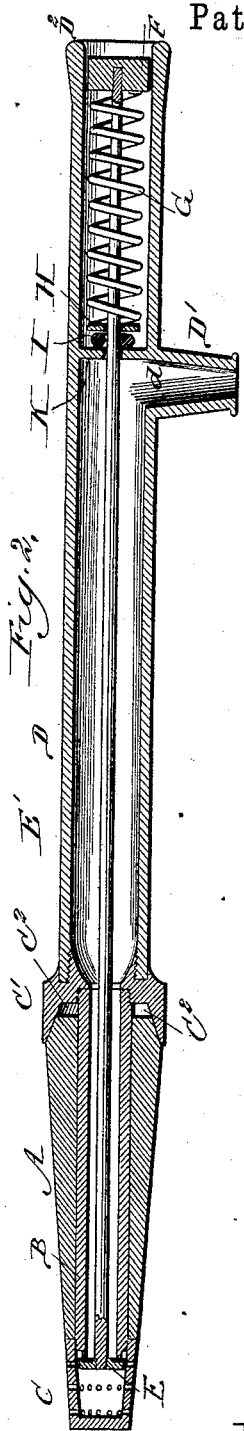
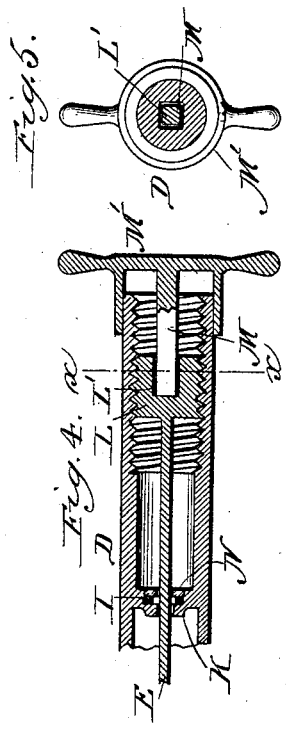
Witnesses.
W. Rossiter
Alfred Fry
Inventor:
William W. Jackson
By Chas. G. Page
Atty.

UNITED STATES PATENT OFFICE.

WILLIAM W. JACKSON, OF CHICAGO, ILLINOIS.

FAUCET.

SPECIFICATION forming part of Letters Patent No. 348,914, dated September 7, 1886.

Application filed March 8, 1886. Serial No. 194,362. (No model.)

*To all whom it may concern:*

Be it known that I, WILLIAM W. JACKSON, brewer and malster, a citizen of the United States, residing at Chicago, in the county of Cook and State of Illinois, have invented certain new and useful Improvements in Faucets, of which the following is a specification.

This invention relates to faucets for tapping casks or kegs of beer, ale, or the like, or for use as a means for drawing off liquids from other vessels where the presence of a faucet is desirable.

The metal faucet in common and general use is tapered at the end that is driven into the keg or cask, while adjacent to its opposite end it is provided with a cock set sufficiently back to permit the faucet to be struck at said end with a mallet or analogous instrument. One objection to a faucet of such a character is that on "tapping" a keg or cask it has been found necessary to first wrap the inner end of the faucet with a paper or a rag. Another serious objection is that on driving in the faucet the material of the cask, keg, or other vessel around the bung-hole is frequently split or otherwise injured, thus rendering further cooperage necessary.

Another want of the trade has been a faucet adapted to be driven into a bung-hole, either plain or bushed with metal, without injury to either the faucet or the material around the bung-hole.

It has heretofore been proposed to fit into one end of the body of a metal faucet a hollow wooden stem, perforated at its end that is to be inserted into the cask or vessel from which the liquid is to be drawn. A faucet of such construction is, however, unfitted for practical use in tapping beer-kegs, since the wooden stem soon becomes split, and thereby rendered worthless.

In another construction of faucet, a tubular metal stem or bushing is screwed into one end of a faucet-head, which latter is at said end recessed, so as to provide around the stem an annular socket, which is rectangular in cross-section. The tubular metal stem of said faucet is inclosed by a wooden jacket, which forms the body of the faucet, and which is at one end provided with an annular shoulder or off-set, and fitted into the said socket. This wooden jacket is held upon the metal stem by a hollow tapering metal plug, which is screwed onto the outer end of the metal stem, and which constitutes the portion of the faucet adapted to enter the bung-hole of a keg or cask. With such construction, the hollow metal plug must obviously be the only portion of the faucet which is driven into the bung-hole, since if the wooden jacket were driven into the bung-hole it would soon split.

The objects of my invention are to avoid all of the said objections and supply all of the said deficiencies in faucets, and to attain the following end, to wit: To provide the end portion of a faucet that is to be driven into the bung-hole of a keg or cask with a wooden or analogous hollow conical plug, normally held upon supporting media in a manner whereby, when it is driven into a bung-hole, its larger or butt end shall be forced into a wedge-shaped socket and tightened therein to an extent proportional to the force employed in driving the hollow conical plug into the bung-hole, the walls of the socket serving in such case to prevent the plug from splitting, and avoiding the necessity of hooping the plug.

To said ends my invention consists in matters hereinafter described and claimed and exemplified in the annexed drawings, where the construction requisite to the attainment of said objects is illustrated.

In said drawings, Figure 1 is a side elevation, and Fig. 2 a longitudinal section, of a faucet embodying the principles of my invention. Fig. 3 is a detail section showing one of the ways in which the wedge-shaped groove, hereinafter described, can be provided, another one of said ways being shown in Fig. 2. Fig. 4 is a detail section showing a modification of the valve-operating devices. Fig. 5 is a section on line *x x*, Fig. 4.

In said drawings the hollow cone A is shown applied to one end of a faucet. Said hollow cone or conical plug is made of some material that will render it suitable and serviceable for insertion into the bung-hole or aperture of a keg, cask, or other vessel, the selection of the material being made chiefly with a view to the provision of a plug that will serve as well for a bung-hole or aperture surrounded by a wooden wall as for one that is bushed with metal, or for an aperture of which the wall may, for example, be of some vitreous substance. To such end the material selected for the hollow cone may, for example, be wood, rubber, or other flexible material, or, as a further illustration, some metallic substance—such, for example, as white metal—may be selected. This cone is shown detachably applied to a stem, so that it can be removed and replaced by another, or, if found desirable, applied to some other faucet having a construction that will adapt it to receive the hollow cone.

As herein illustrated, the hollow cone is provided with a straight cylindric bore, and is fitted upon a tube or hollow cylindric stem, B, that can be made in one piece with or formed separately from the body of the faucet. The hollow cone can be screwed or slipped upon this stem, (which constitutes in fact a support or lining for the hollow cone,) and is held thereon and protected by two shoulders or abutments, one arranged opposite each end of the hollow cone. The abutment C opposite the smaller end of the hollow cone consists, as herein shown, of a hollow perforated cap or tip that is detachably secured to one end of the stem B, a simple mode of attachment being to screw the perforated tip onto a threaded end of the stem. The feature of forming this shoulder or abutment of a hollow perforated tip possesses several advantages, the one being that it constitutes a desirable end for the hollow conical plug when the latter is driven into a stoppered bung-hole, and the other that the liquid when drawn off from a keg or cask will be strained of any foreign substances—such, for example, as shavings that may have been left in a keg or cask of beer. The abutment or shoulder C', that is opposite the inner and longer end of the hollow cone, may be made integral with or separate from the body of the faucet. In case it is made integral with the faucet-body and forms part of the same, the stem B can be made integral with or separate from said abutment, or, on the other hand, the abutment can be made separate from the faucet-body, in which case the stem B can be made integral with or separate from the abutment. It will be apparent that any common form of joint between said parts could be employed—as, for example, the stem can be screwed into the abutment and the abutment screwed onto the body of the faucet, thus permitting the abutment and stem to be detached as a whole from the faucet-body, and either screwed onto some other faucet-body or used as a plug or faucet, or that the stem, with the hollow conical plug, could be detached and used by itself as a stopper or faucet with advantage. The abutment C', when made separate from the stem B, is formed with a somewhat tapered recess—that is to say, with a recess of which the walls converge inwardly—so that when the stem is fitted to said abutment, as in Fig. 2, so as to enter said recess centrally, a wedge-shaped or proximately V-shaped annular groove or socket, C², will be formed between the cylindric surface of said stem and the wall of said recessed abutment. On the other hand, if the abutment and the stem are not in one piece, the abutment will be formed so as to afford the same annular wedge or V-shaped socket C², Fig. 3. The hollow cone A employed in conjunction with such construction is provided at its larger end with a bevel or reverse taper, as in Fig. 2, to permit it under ordinary circumstances to enter the wedge-shaped socket only partially, so that a space will be normally left between the large end of the hollow cone and the bottom of the socket, as clearly shown in Fig. 2, wherein the beveled rear inner end portion of the hollow cone is shown fitted against the inclined wall of the socket that is formed in what I have herein termed one of the "shoulders" or "abutments."

The wedge-shaped socket, in conjunction with the hollow conical plug fitted to enter the socket for a portion only of the depth of the socket, so as to leave a space back of the larger end of hollow cone or hollow conical plug, constitutes of itself an important feature for the following reason, to wit: When the hollow cone is driven, for instance, into the bunghole of a keg or cask, the tendency to injure the material around the bung-hole will be increased proportionately to the extent to which the conical plug is driven into the bung-hole; but by reason of the space back of the conical plug room is left to permit the conical plug to be crowded back and compressed to an extent which will compensate such unnecessary force as is frequently exerted in tapping kegs, casks, or the like. This also prevents splitting of the cone, since the more forcibly the faucet is driven in the tighter the cone is wedged into the socket, thus avoiding the necessity of bands or hoops around the cone. The use of the cone also avoids injury to the keg or cask, and will save future cooperage of the kegs or casks, and thus relieve brewers of a large expense heretofore incurred. The feature of a straight cylindric stem in conjunction with the conical plug having a straight cylindric bore and the wedge-shaped socket also adds to the efficiency of the device, since the crowding back and tightening up of the hollow plug in the socket is facilitated, which, with the stem tapered, might be otherwise.

The hollow cylindric body or tube D herein represents an extension of that portion of the faucet that is to be directly applied to the keg, cock, or the like. Said tubular body D is shown provided with a lateral discharge-orifice, d, desirably connected with a short hollow teat or nozzle, D', for the exit of the liquid to be drawn off.

When the conical plug is driven into the keg or vessel to be tapped, the flow of liquid therefrom will be checked by a valve arranged at some appropriate point in the device herein shown. In the present illustration the valve E is shown arranged to close against the outer end of the stem B, or proximately against the smaller end of the hollow conical plug fitted upon a tubular stem. The feature of a valve applied to close a faucet at this end has heretofore been attempted, and is therefore not herein claimed.

Referring more particularly to Fig. 2, the stem E' of the valve is extended back to and connected with a push-button or follower, F, arranged to slide within the tubular faucet-body and normally held at a short distance back from the open end D² of said body by a spring, G. This spring bears at one end against the push-button, and at its opposite end is attached to or applied against a washer, H, that backs against a packing-ring, I, held within the tubular faucet-body. The said packing-ring is held against a fixed partition, K, in the tubular faucet-body, by reason of the expansive force of the spring G, which serves to directly back the push-button. This packing serves as a stuffing for the valve-stem at the point where the latter passes through a perforation in the partition K.

By reason of the foregoing construction the push-button can at any time be readily operated for the purpose of opening the valve, and at the same time the valve-operating devices are entirely inclosed within a straight tubular faucet-body that can be struck by a mallet or other implement at its end D² without injury to the valve-operating devices and without tending to knock the faucet sidewise, as would occur in a faucet having a lateral projection to receive the impact of the blows.

With regard to partition K, it will be observed that it is located beyond the discharge-nozzle D of the tubular faucet-body, so as to prevent any discharge through the outer open end D² of the faucet-body, in addition to which function it serves as a guide for the valve-stem. Obviously, the valve-stem can be made of any desired length, so as to either bring the valve at the point herein shown or at any suitable distance back of such point, although its present location is preferable.

In Figs. 4 and 5 the device employed as a sliding push-button or follower in Fig. 2 is threaded and screwed into a threaded portion of the tubular faucet-body, thus forming a rotary follower, L, that by reason of a quick-thread can, with a partial or single turn, be advanced or retarded sufficiently to open or close the valve. With a follower of such construction it is proposed to form a squared socket, L', in the follower, so that a suitable key can be inserted in said socket as a means for turning the follower in order to adjust the same back and forth within the tubular faucet-body.

The key M preferably consists of a squared stem united to a cap, M', that can be fitted on the outer end of the tubular faucet-body, thus closing the same at said end, except when it becomes necessary to tap, in which case the cap can be readily detached. In said Fig. 4 the packing I is fitted within a recess formed in the partition K, and nut N is then screwed into said recess, so as to hold in the packing.

What I claim as my invention is—

1. A faucet provided with the hollow conical plug A, having a straight cylindric bore and fitted upon the straight tubular stem or bushing, combined with the annular wedge-shaped socket which is formed around one end portion of said stem and into which the butt-end of the conical plug is fitted to an extent to normally provide a space back of the butt-end of the conical plug, substantially as described.

2. The hollow faucet provided at one end with a straight tubular stem, B, and an annular wedge-shaped socket formed around said stem at the junction of the latter with the faucet-body, combined with the hollow conical plug A, that is provided with a straight cylindric bore and fitted upon the tubular stem to normally enter the said socket to an extent to leave a space back of its butt-end, substantially as described.

WILLIAM W. JACKSON.

Witnesses:
CHAS. G. PAGE,
ALFRED FRY.